United States Patent
Grün et al.

(10) Patent No.: US 6,841,648 B2
(45) Date of Patent: Jan. 11, 2005

(54) POLYMERS MODIFIED BY FUNCTIONAL GROUPS

(75) Inventors: Michael Grün, Siegburg (DE); Wilfried Braubach, Solingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 43 days.

(21) Appl. No.: 10/314,831

(22) Filed: Dec. 9, 2002

(65) Prior Publication Data

US 2003/0125476 A1 Jul. 3, 2003

(30) Foreign Application Priority Data

Dec. 12, 2001 (DE) .......................................... 101 60 849

(51) Int. Cl.⁷ ............................................... C09G 77/14
(52) U.S. Cl. ............................. 528/31; 528/32; 528/33; 526/303.1; 526/304; 526/332; 526/335; 526/347
(58) Field of Search ............................... 528/31, 32, 33; 526/303.1, 304, 332, 335, 347

(56) References Cited

FOREIGN PATENT DOCUMENTS

| EP | 0 150 479 | 8/1985 |
|---|---|---|
| EP | 0 150 479 A2 * | 8/1985 |
| EP | 0 198 294 | 10/1986 |
| EP | 0 180 853 | 10/1989 |
| EP | 0 661 298 | 7/1995 |
| EP | 0 849 333 | 6/1998 |
| EP | 0 767 179 | 6/2001 |
| GB | 2 117 778 | 10/1983 |

* cited by examiner

*Primary Examiner*—Robert D. Harlan
(74) *Attorney, Agent, or Firm*—Godfried R. Akorli; Jennifer R. Seng

(57) ABSTRACT

The present invention relates to polymers which are modified by functional end groups and are based on conjugated dienes or on conjugated dienes and vinylaromatic compounds, a process for their preparation and their use for the production of rubber shaped articles of all types, in particular for the production of tires and tire components, such as tire treads.

4 Claims, No Drawings

POLYMERS MODIFIED BY FUNCTIONAL GROUPS

FIELD OF THE INVENTION

The present invention provides polymers which are modified by functional end groups and are based on conjugated dienes or on conjugated dienes and vinylaromatic compounds, a process for their preparation and their use for the production of rubber shaped articles of all types, in particular for the production of tires and tire components, such as tire treads.

BACKGROUND OF THE INVENTION

It is known, to improve the physical properties of the rubbers used in tire construction in particular, to modify these in the most diverse manner, for example by introduction of particular end groups or by modification of the internal build-up of the polymer molecules. By modification of the polymers, for example by introduction of particular end groups, the physical properties, for example the rolling resistance or the wet skid properties, are said to be improved, as mentioned, in order to lower the fuel costs of cars and to increase their safety, in particular in the wet. Furthermore, bonding of the rubbers to be employed in tire construction to the fillers used there, in particular to the light-colored fillers, such as silica, should be improved substantially, so that a firm bond arises between the rubber matrix and the filler. The processing of such polymers or rubbers, in particular those to which light-colored fillers have been added, in the corresponding processing machines is furthermore said to be improved by the introduction of particular functional groups into the polymer molecules. British Patent Application GB 2 117 778-A and European Patent Application 0 180 853 A describe methods for the modification of unsaturated polymers with, for example, aromatic ketones or particular aminoaldehydes or aminoketones. By introduction of appropriate end groups into the unsaturated polymers, a good balance between rolling resistance and wet skid resistance in the tire rubber is achieved.

European Patent Application EP 0 767 179 A2 describes a process for the preparation of rubber mixtures which are modified in the end group by particular organosilicon compounds. A better bonding of the rubbers to the fillers comprising silica is said to be effected by the end group modification of the corresponding rubbers.

As has been found in our own experiments, the organosilicon compounds described in the European Patent Application mentioned, which are said to be for modification of the rubbers, are not so stable that they could withstand an attack by polymer anions. This means that the organosilicon compounds employed according to the European Patent Application for the modification of the rubbers lead not only to an end group modification of the rubbers but also to a high degree to undesirable multiple coupling reactions of the polymer anions present.

SUMMARY OF THE INVENTION

The object of the present invention is to provide polymers which are modified by functional end groups and are based on conjugated dienes or on conjugated dienes and vinylaromatic compounds, and which show, in particular, improvements in respect of the processing properties together with improved physical and dynamic properties and therefore, bring about a more balanced ratio of wet skid resistance and rolling resistance in the tire rubbers.

DETAILED DESCRIPTION OF THE INVENTION

Therefore, the present invention provides polymers which are modified by functional end groups and are based on conjugated dienes or on conjugated dienes and vinylaromatic compounds, and have an average molecular weight $(M_w)$ of greater than 10,000 g/mol, a molecular weight distribution $(M_n/M_w)$ of 1.3 to 5 and have functional end groups which are derived from compounds of the formula (I)

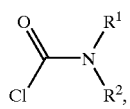

(I)

wherein
  $R^1$ and $R^2$ are identical or different and represent hydrogen, or represent linear or branched alkyl groups having 1 to 15 carbon atoms, or represent aryl groups having 6 to 10 carbon atoms, or represent cycloalkyl groups having 5 to 10 carbon atoms, or represent aralkyl groups having 1 to 4 carbon atoms in the alkyl part and 6 to 10 carbon atoms in the aryl part, or wherein
  $R^1$ and $R^2$, together with the nitrogen atom, form a heterocyclic ring which contains 2 to 10 carbon atoms, and in addition can also be interrupted by 1 to 3 heteroatoms of the third to seventh main group of the periodic table of the elements, such as nitrogen, oxygen or sulfur,
or from compounds of the formula (II)

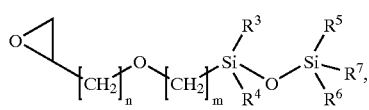

(II)

wherein
  $R^3$ to $R^7$ are identical or different and represent hydrogen, linear or branched alkyl groups having 1 to 15 carbon atoms, aryl groups having 6 to 10 carbon atoms, cycloalkyl groups having 5 to 10 carbon atoms or aralkyl groups having 1 to 4 carbon atoms in the alkyl part and 6 to 10 carbon atoms in the aryl part, or wherein
  $R^3$ to $R^7$ represent the radical

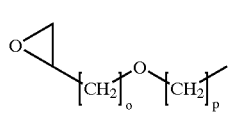

and
  n, m, o, p independently of one another represent the numbers 1 to 12, the content of functional end groups being 40 to 100 mol %, based on the total number of polymer chains present.

The polymers according to the invention preferably have an average molecular weight $(M_w)$ of 1,000 to 2,000,000, preferably 100,000 to 800,000.

The molecular weight distribution $(M_n/M_w)$ is preferably in a range from 1.3 to 4, preferably in the range from 1.5 to 3.5.

The polymers modified according to the present invention have, in particular, a content of functional end groups of 50 to 100 mol %, preferably 70 to 100 mol %.

The modified polymers according to the present invention have—depending on the nature of the modifying agents employed, the reaction conditions which exist and the chosen molar ratios of the modifying agents employed to the polymerizable monomers—a degree of coupling of about 10 to 20%, preferably 12 to 17%, based on the total number of polymer chains present. The degree of coupling is caused by a linear coupling reaction of the modifying agents employed with the polymer anions present, which contributes towards a molecular weight coupling.

The $T_g$ value of the modified polymers according to the present invention is −10 to −50° C., preferably −15 to −30° C.

All known dienes which are conventional for the preparation of appropriate polymer anions can be employed as conjugated dienes for building up the polymers according to the present invention. Examples which may be mentioned are: 1,3-butadiene, 2,3-dimethyl-1,3-butadiene, 3-butyl-1,3-octadiene, isoprene, piperylene, 1,3-hexadiene, 1,3-octadiene and 2-phenyl-1,3-butadiene, preferably 1,3-butadiene and isoprene and mixtures thereof.

Possible vinylaromatic compounds are likewise the known vinylaromatic compounds which can be copolymerized together with the conjugated dienes. Examples which are to be mentioned are: styrene, p-methylstyrene, α-methylstyrene, 3,5-dimethylstyrene, vinylnaphthalene, p-tert-butylstyrene, divinylstyrene, divinylethylene, 4-propylstyrene, p-tolylstyrene, 1-vinyl-5-hexylnaphthalene, 1-vinylnaphthalene or mixtures of the vinylaromatic compounds mentioned, preferably styrene, p-methylstyrene and α-methylstyrene, in particular styrene.

In the copolymers, the content of vinylaromatic compounds is conventionally 5 to 55 wt. %, preferably 10 to 45 wt. %, and the amount of conjugated dienes is correspondingly 45 to 95 wt. %, preferably 55 to 90 wt. %. The copolymers can be a random, staged block or complete block copolymer of the various monomers mentioned.

Radicals $R^1$ and $R^2$ in the abovementioned formula (I) which are to be mentioned as preferred are: hydrogen, linear or branched alkyl radicals having 1 to 6 carbon atoms, such as methyl, ethyl, propyl, butyl, pentyl, isopropyl, isobutyl and isopentyl, aryl radicals having 6 to 10 carbon atoms, such as phenyl, naphthyl and xylyl, alkylaryl radicals having 1 to 4 carbon atoms in the alkyl part and 6 to 10 carbon atoms in the aryl part, such as methyl, ethyl, propyl, butyl, pentyl, isopropyl, isobutyl and isopentyl in the alkyl part and phenyl, naphthyl and xylyl in the aryl part, and radicals wherein $R^1$ and $R^2$, together with nitrogen, form a heterocyclic ring which contains 2 to 10 carbon atoms and is additionally interrupted once by oxygen, nitrogen or sulfur, in particular by oxygen, and cycloalkyl groups having 5 to 7 carbon atoms, such as cyclopentyl and cyclohexyl. Particularly preferred suitable radicals $R^1$ and $R^2$ in the formula (I) are: methyl, ethyl, isopropyl, phenyl, cyclohexyl and isobutyl, and radicals wherein $R^1$ and $R^2$, together with the nitrogen, in the formula (I) form a heterocyclic ring, such as a morpholine, 1-pyrrolidine or 2,3-dioxo-4-ethyl-1-piperazine ring.

The compounds of the formula (I) can of course be substituted, in particular mono- or disubstituted, by alkyl radicals having 1 to 4 carbon atoms, such as methyl, ethyl, propyl and isopropyl.

The compounds of the formula (I) listed by way of formulae below are preferably used for modification of the polymers:

bis-(1-methylpropyl)carbamic acid chloride

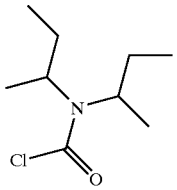

4-morpholinecarbonyl chloride

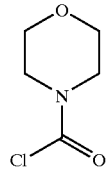

EINBETTEN 1-pyrrolidinecarbonyl chloride

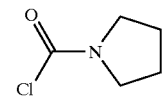

N,N-dimethylcarbamic acid chloride

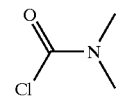

EINBETTEN

N,N,-diethylcarbamic acid chloride EINBETTEN

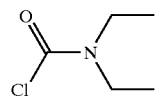

Possible preferred radicals $R^3$ to $R^7$ in the formula (II) are the radicals $R^1$ and $R^2$ already mentioned as preferred for the formula (I). In addition, the epoxy-ether radical already mentioned in the formula (II) is preferred. Preferred numbers for n, m, o and p in the formula (II) are 1 to 10.

The alkyl radicals are very preferred as radicals $R^3$ to $R^7$ in the formula (II), such as the methyl, ethyl, propyl, isopropyl, butyl, isobutyl and the pentyl and isopentyl radical.

Compounds of the formula (II) in which the radical $R^7$ represents the epoxy-ether radical described in more detail above are likewise very particularly preferred.

The preferred epoxy-silyl ethers of the formula (II) are listed below by way of their formulae:

1,3-bis-(glycidyloxypropyl)-tetramethyldisiloxane

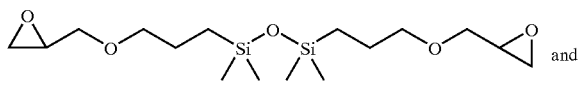 and

EINBETTEN(3-glycidyloxypropyl)-pentamethyldisiloxane

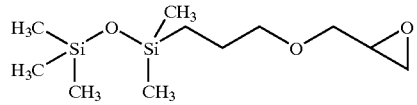

EINBETTEN

It is of course possible to employ the compounds of the formula (I) and (II) in any desired mixture with one another in the modification of the polymers, so that polymers with corresponding mixed functional end groups are formed.

The present invention also provides a process for the preparation of polymers which are modified by functional end groups and are based on conjugated dienes or on conjugated dienes and vinylaromatic compounds and have the above-mentioned average molecular weight, the molecular weight distribution mentioned and the content mentioned of functional end groups, which is characterized in that conjugated dienes or conjugated dienes and vinylaromatic compounds are reacted in an inert organic solvent in the presence of an alkali metal and/or alkaline earth metal catalyst and the anionic polymer terminated by alkali metal and/or alkaline earth metal is then reacted with at least one of the abovementioned compounds of the formula (I) and/or (II), the compounds of the formula (I) and/or (II) being employed in amounts of 0.1 to 10 mol per 1 mol of the initiator employed.

The polymerization of the conjugated dienes or of the conjugated dienes with the vinylaromatic compounds (copolymerization) takes place in an inert, aprotic, organic solvent, such as, for example, paraffinic hydrocarbons, e.g. isomeric pentanes, hexanes, heptanes, octanes or decanes, 2,4-trimethylpentane, cyclopentane, cyclohexane, methylcyclohexane, ethylcyclohexane or 1,4-dimethylcyclohexane, or aromatic hydrocarbons, such as benzene, toluene, ethylbenzene, xylene, dimethylbenzene or propylbenzene. These solvents can be employed individually or as a mixture with one another. Cyclohexane and n-hexane are preferably employed as the solvent.

A polar solvent can optionally be added to the aprotic solvents mentioned in the copolymerization of vinylaromatic compounds with the conjugated dienes to increase the rate of polymerization and/or for modification of the polymer structures. Suitable polar solvents include ethers, such as tetrahydrofuran, diethyl ether, cycloallyl ether, dipropyl ether, ethylene-dimethyl ether, ethylene-diethyl ether, diethylene glycol, dimethyl ether, tert-butoxyethoxyethane or bis-(2-dimethylaminoethyl)ether, preferably tert-butoxyethoxyethane or bis-(2-dimethylaminoethyl)ether, and tertiary amines, such as trimethylamine, triethylamine tripropylamine or tetramethylethylenediamine, preferably triethylamine or tetramethylethylenediamine. The microstructure of the corresponding copolymers can, furthermore, be modified with the addition of the polar solvent, for example from staged block to random. The polar solvents to be employed for modification of the polymers are in general employed in the anionic polymerization in amounts of 0.1 to 40 mol, preferably 0.1 to 10 mol per 1 mol of the alkali metal or alkaline earth metal catalyst employed.

The amount of solvent to be employed can vary within wide ranges. It is conventionally about 300 to 1,500 parts by wt. per part by wt. of total monomers.

The preparation of the polymers modified according to the present invention is carried out in two steps. In the first step, a live, anionic polymer which is terminated by alkali metal or alkaline earth metal is prepared, and in the second step is linked in the end group with the compounds of the formula (I) and (II) according to the invention defined above.

The first step of the preparation of the polymers according to the present invention is in general carried out by a procedure in which, preferably, an alkali metal initiator system is reacted with the particular monomer or the monomer mixture in order to form the live anionic polymers. This polymerization step can be carried out in one step or in a sequence of steps. If the polymeric chain is a homopolymer or a random or staged copolymer of two or more monomers, the monomers are polymerized simultaneously with the alkali metal catalyst. If the polymer chain is a block copolymer which comprises two or more homo- or copolymer blocks, the individual blocks can be produced in incremental or successive additions of monomer.

Alkali metal or alkaline earth metal catalysts which can be employed are lithium, sodium, potassium, rubidium, cesium, beryllium, magnesium, calcium, strontium and barium, and lithium is preferably employed.

Furthermore, the alkali metal compounds of the general formula $$R^1\text{-M}$$

wherein $R^1$ represents a hydrocarbonyl radical having 1 to 20 carbon atoms and M is an alkali metal chosen from lithium, sodium, potassium, rubidium or cesium are preferably employed as the alkali metal-based initiator systems (catalyst systems).

Examples of such initiator systems are methyllithium, isopropyllithium, n-butyllithium, s-butyllithium, isobutyllithium, tert-butyllithium, tert-octyllithium, hexyllithium, n-undecyllithium, phenyllithium, naphthyllithium, p-tolyllithium, 4-phenylbutyllithium, cyclohexyllithium and 4-cyclohexylbutyllithium.

The amount of alkali metals, alkaline earth metals or alkali metal compounds to be employed depends on the desired properties of the polymer, in particular the desired molecular weight. The alkali metal compounds are usually employed in the range from 0.2 to 20 mmol/100 g of the monomers employed in total.

The polymerization temperature can vary within wide ranges and is in general in the range from 0° C. to 200° C., and is preferably 40° C. to 130° C. The reaction time likewise varies within wide ranges from a few minutes up to some hours. The polymerization is conventionally carried out within a time span of about 30 minutes to 8 hours, preferably 4 hours. It can be carried out both under normal pressure and under increased pressure (up to 10 bar).

In carrying out the second reaction step, the anionic polymers obtained, which are terminated by alkali metal and/or alkaline earth metal, are reacted with at least one of the compounds of the formula (I) and (II) mentioned, i.e. the modifying agents, the compounds of the formula (I) and (II) preferably being employed in amounts of 0.5 to 4 mol per 1 mol of the initiator employed.

In this so-called end group modification, it is to be ensured that interfering compounds which can impair the end group modification are not present. Such interfering compounds are e.g. carbon dioxide, oxygen, water, halides, alcohols and organic and inorganic acids and other protic organic substances.

The linking reaction (i.e. the modification reaction) is conventionally carried out at temperatures which approximately correspond to the temperatures of the polymerization reaction. This means that the linking reaction is carried out at temperatures from about 0° C. to 200° C., preferably 50° C. to 120° C. The linking reaction can likewise be carried out under normal pressure and also under increased pressure (1 bar to 10 bar).

The linking reaction is relatively short. It is in the range from about 1 minute to 1 hour.

After the linking reaction, the polymers modified in the end group which now result are obtained by treating the reaction mixture with terminating reagents which contain active hydrogen. Such terminating reagents are, for example, alcohols or water or mixtures thereof. It is furthermore of advantage if antioxidants are added to the reaction mixture before the linked polymer is isolated.

The polymer according to the present invention is separated off in the conventional manner, for example by steam distillation or flocculation with a suitable flocculating agent, such as alcohol. The polymer which has been flocculated out is then removed from the resulting medium, for example, by centrifugation or extrusion. Residual solvent and other volatile constituents can be removed from the isolated polymer by heating, optionally under reduced pressure or in a fan-assisted air stream.

The polymers according to the present invention can be prepared both in a discontinuous and in a continuous procedure. The continuous procedure in a reaction cascade comprising several, preferably at least two, in particular 2 to 4, reactors connected in series is preferred.

As already mentioned above, during the linking of the polymer anions with the modifying agents described, coupled polymers are also obtained to a certain degree (about 10 to 20%, based on the total number of polymer chains present), the degree of coupling of which—as likewise explained above—depends on the modifying agents employed, on the molar ratios chosen between the modifying agents and monomers and on the reaction conditions chosen.

The conventional compounding components, such as fillers, dyestuffs, pigments, softening agents and reinforcing agents, can of course also be added to the polymers according to the present invention; furthermore the known rubber auxiliaries and crosslinking agents as described in "Handbuch für die Gummiindustrie [Handbook for the Rubber Industry]", 2nd edition, 1991, publisher: Bayer A G.

The polymers according to the invention which are modified by functional end groups can be used in a known manner for the production of rubber shaped articles of all types, in particular for the production of tires and tire components, of golf balls and other industrial rubber articles, and also for the production of rubber-reinforced plastics, such as ABS and HIPS plastics.

It is furthermore possible to blend the polymers according to the present invention which are modified by functional end groups with other rubbers, such as natural rubber or other synthetic rubbers, such as polybutadiene and SBR, in order to achieve the most favorable physical properties of the rubber shaped articles—according to the intended use.

The most favorable mixing ratio can easily be determined here according to the aim of use by means of preliminary experiments. The non-modified rubbers mentioned are conventionally added in amounts of about 1 to 50 parts by weight per 100 parts by weight of the total rubber mixture.

It is, of course, also possible to blend the polymers modified in the manner according to the present invention with other known polymers modified in the end group, the known polymers modified in the end group being employed in amounts of about 1 to 50, preferably 5 to 45 parts by wt. per 100 parts by wt. of the total rubber mixture. Other polymers modified in the end group are known, for example, from Houben-Weyl; Methoden der organischen Chemie [Methods of Organic Chemistry]; 4th edition volume E20, Makromolekulare Stoffe [Macromolecular Substances], p. 129 et seq. and 1994 et seq.; Georg-Thieme Verlag Stuttgart-New York 1986. The end group can be modified here by reaction of the polymer anions with alcohols, aldehydes, ketones, amines, organotin compounds or isocyanates.

EXAMPLES

Example 1

Preparation of a styrene/butadiene copolymer with modified end groups, with N,N'-dimethylcarbamic acid chloride as the modifying agent.

8,500 g technical-grade hexane were initially introduced into an autoclave which was purged with nitrogen and provided with a stirrer. Thereafter, 49.90 mmol tert-butoxyethoxyethane, 0.94 mmol potassium tert-amylate and 17 mmol n-butyllithium (BuLi) were added, while stirring, to the hexane which had been initially introduced. 1,200 g dried, destabilized 1,3-butadiene and 345 g dried, destabilized styrene were then metered into this mixture. The polymerization of the monomers was carried out at a temperature of 70° C. until conversion of the monomer was complete. 17 mmol N,N'-dimethylcarbamic acid chloride were then metered into the mixture in situ and the mixture was subsequently stirred for 30 min at 70° C. Thereafter, the contents of the reactor were cooled and the reaction was stopped with ethanol. The product obtained was then stabilized with Vulkanox® BHT and dried at 60° C. in a drying cabinet.

Example 2

Preparation of a styrene/butadiene copolymer with modified end groups, with 1,3-bis-(3-glycidyloxypropyl)-tetramethyldisiloxane as the modifying agent.

8,500 g technical-grade hexane were initially introduced into an autoclave which was purged with nitrogen and provided with a stirrer. Thereafter, 49.90 mmol tert-butoxyethoxyethane, 0.94 mmol potassium tert-amylate and 17 mmol n-butyllithium (BuLi) were added, while stirring, to the hexane which had been initially introduced. 1,200 g dried, destabilized 1,3-butadiene and 345 g dried, destabilized styrene were then metered into this mixture. The polymerization of the monomers was carried out at a temperature of 70° C. until conversion of the monomer was complete. 17 mmol 1,3-bis-(3-glycidyloxypropyl)-tetramethyldisiloxane were then metered into the mixture in situ and the mixture was subsequently stirred for 30 min at 70° C. Thereafter, the contents of the reactor were cooled and the reaction was stopped with ethanol. The product obtained was then stabilized with Vulkanox® BHT and dried at 60° C. in a drying cabinet.

The physical parameters of the copolymer obtained are listed in the following table.

TABLE 1

Polymer analysis of the modified polymers obtained gave the following data:

| | ML1 + 4 @ 100° C. | Styrene [wt. %] | 1,4-cis [wt.%] | 1,4-trans [wt. %] | Vinyl [wt. %] | $T_g$ [° C.] | L value before modification | L value after modification | GPC $M_w$ [g/mol] | Polydispersion |
|---|---|---|---|---|---|---|---|---|---|---|
| Example 1 | 57 | 19.8 | 12.1 | 16.2 | 52.0 | −23.5 | 212 | 248 | 333,390 | 1.5 |
| Example 2 | 60 | 19.3 | 12.2 | 16.2 | 52.4 | −24.2 | 196 | 249 | 362,029 | 1.6 |
| Reference | 58 | 19.3 | 12.5 | 16.9 | 51.3 | −24.2 | 191 | 191 | 305,705 | 1.3 |

| | GPC | | Elemental | Coupling yield |
|---|---|---|---|---|
| | $M_w$[g/mol] | Polydispersion | analysis | according to GPC |
| Example 1 | 333,390 | 1.5 | 152 ppm (N) | 20% |
| Example 2 | 362,029 | 1.6 | 220 ppm (Si) | 34% |

ML 1 + 4: Mooney values
GPC: Gel permeation chromatography
$M_w$: average molecular weight, $$\text{Polydispersion} = \frac{M_w}{M_n}$$

EINBETTENL value: Viscosity number (0.5 g polymer/100 ml toluene)

Evaluation according to: $L = \left(\frac{t}{t_0} - 1\right) \cdot 200$

EINBETTEN where t = flow time of the polymer solution in sec
$t_0$ = flow time of the solvent in sec
Microstructure determined by infrared spectroscopy
$T_g$: Glass transition temperature according to DSC (differential scanning calorimetry)
Reference: Styrene/butadiene copolymer without end group functionalization prepared analogously to the recipe of example 1.

The properties of vulcanization products with carbon black as a filler and silica as a filler with polymers according to the invention and polymers which were only coupled but not modified in end groups (not according to the invention) are listed in the following tables.

TABLE 2

Carbon black mixtures

| | Reference | Example 1 | Example 2 |
|---|---|---|---|
| Reference according to the prior art | 60 | | |
| Polymer example 1 | | 60 | |
| Polymer example 2 | | | 60 |
| Buna CB 25 ® | 40 | 40 | 40 |
| Carbon Black N 234 | 50 | 50 | 50 |
| Mineral oil* | 5 | 5 | 5 |
| ZnO RS | 3 | 3 | 3 |
| Stearic acid | 2 | 2 | 2 |
| Antilux 654 ®** | 1.5 | 1.5 | 1.5 |
| Vulkanox HS ®**** | 1 | 1 | 1 |
| Vulkanox 4020 ®*** | 1 | 1 | 1 |
| Vulkacit CZ ®****** | 1.4 | 1.4 | 1.4 |
| Vulkacit D ®******* | 0.3 | 0.3 | 0.3 |
| Sulfur | 1.8 | 1.8 | 1.8 |

TABLE 3

| Mixture properties, DIN 53523 | | | |
|---|---|---|---|
| Mooney viscosity ML1 + 4 @ 100° C. | 81 | 79 | 81 |
| Vulcanization product properties, ISO 37 | | | |
| Strength, MPa | 21.08 | 20.328 | 19.35 |
| Elongation at break, % | 392 | 386 | 378 |
| Modulus 100%, MPa | 2.88 | 2.63 | 2.85 |
| Modulus 300%, MPa | 13.76 | 14.38 | 14.07 |
| Degree of reinforcement | 4.8 | 5.5 | 4.9 |
| Hardness 23° C., Shore A | 65.7 | 63.9 | 64.6 |
| Hardness 70° C., Shore A | 64 | 63 | 62.8 |
| Elasticity 23° C., % | 48 | 45.8 | 47.8 |
| Elasticity 70° C., % | 58.7 | 60.4 | 59.8 |
| Roelig, 10 HZ, DIN 53513 | | | |
| tan delta 60° C. | 0.129 | 1.122 | 0.123 |

In typical vulcanization products with carbon black as a filler for tire treads, the polymers according to the invention called example 1 and example 2 show significant advantages in the degree of reinforcement compared with the polymer according to the prior art (reference), which illustrates the interaction of the polymer with the filler. As a consequence, this leads to an increase in the elasticity, especially at high temperatures (70° C.), and to a lowering of the Roelig tan delta at 60° C., which the expert equates with a reduction in the rolling resistance of correspondingly produced tires.

TABLE 4

Silica mixtures

|  | Reference | Example 1 | Example 2 |
|---|---|---|---|
| Reference according to the prior art (coupled) | 70 | | |
| Polymer example 1 | | 70 | |
| Polymer example 2 | | | 70 |
| Buna CB 25 ® | 30 | 30 | 30 |
| Mineral oil* | 37.5 | 37.5 | 37.5 |
| Vulkasil S ®******** | 80 | 80 | 80 |
| Silane Si 69 ®********* | 6.4 | 6.4 | 6.4 |
| ZnO RS | 2.5 | 2.5 | 2.5 |
| Stearic acid | 1 | 1 | 1 |
| Vulkanox HS ®**** | 1 | 1 | 1 |
| Vulkanox 4020 ®*** | 1 | 1 | 1 |
| Vulkacit CZ ®****** | 1.8 | 1.8 | 1.8 |
| Vulkacit D ®******* | 2 | 2 | 2 |
| Sulfur | 1.5 | 1.5 | 1.5 |

*Enerthene 1849-1, mineral oil plasticizer, Mobil Schmierstoff GmbH
**Light stabilizer wax, Rhein Chemie Rheinau
***Anti-aging agent (6PPD), Bayer AG
****Anti-aging agent (TMQ), Bayer AG
******Sulfenamide accelerator (CBS), Bayer AG
*******Guanidine accelerator (DPG), Bayer AG
********Silica, Bayer AG
*********Silane, Degussa

TABLE 5

Mixture properties, DIN 53523

| | | | |
|---|---|---|---|
| Mooney viscosity ML1 + 4 @ 100° C. | 80.5 | 80.5 | 83.0 |
| Vulcanization product properties, ISO 37 | | | |
| Strength, MPa | 16.8 | 18.3 | 18.5 |
| Elongation at break, % | 393 | 425 | 422 |
| Modulus 100%, MPa | 3.6 | 3.1 | 3.4 |
| Modulus 300%, MPa | 11.8 | 11.7 | 11.5 |
| Degree of reinforcement | 3.3 | 3.8 | 3.4 |
| Hardness 23° C., Shore A | 73 | 72 | 72 |
| Hardness 70° C., Shore A | 71 | 71 | 71 |
| Elasticity 23° C., % | 37 | 39 | 41 |
| Elasticity 70° C., % | 55 | 56 | 58 |
| Roelig, 10 HZ, DIN 53513 | | | |
| tan delta −20° C. | 0.389 | 0.433 | 0.420 |
| 60 | 0.121 | 0.115 | 0.115 |

* Enerthene 1849-1, mineral oil plasticizer, Mobil Schmierstoff GmbH
** Light stabilizer wax, Rhein Chemie Rheinau
*** Anti-aging agent (6PPD), Bayer AG
**** Anti-aging agent (TMQ), Bayer AG
***** Sulfenamide accelerator (CBS), Bayer AG
****** Guanidine accelerator (DPG), Bayer AG
******* Silica, Bayer AG
******** Silane, Degussa In vulcanization products with silica as the filler, the polymers according to the invention likewise show an improved interaction with the filler, expressed by increased degrees of reinforcement. In addition to the reduced rolling resistance (lower tan delta at 60° C.), with this type of tread mixtures the properties in the wet of tires produced therefrom are improved (increased tan delta at −20° C.).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Polymers which are modified by functional end groups and are based on conjugated dienes or on conjugated dienes and vinylaromtic compounds, and have an average molecular weight (Mw) of greater than 10,000 g/mol, a molecular weight distribution (Mn/Mw) of 1.3 to 5 and have functional end groups which are derived from compounds of the formula (I)

$$\underset{Cl}{\overset{O}{\diagdown}}\hspace{-0.5em}C\hspace{-0.5em}-\hspace{-0.5em}N\underset{R^2}{\overset{R^1}{\diagup}} \quad (I)$$

wherein

R$^1$ and R$^2$ are identical or different and represent hydrogen, or represent linear or branched alkyl groups having 1 to 15 carbon atoms, or represent aryl groups having 6 to 10 carbon atoms, or represent cycloalkyl groups having 5 to 10 carbon atoms, or represent aralkyl groups having 1 to 4 carbon atoms in the alkyl part and 6 to 10 carbon atoms in the aryl part, or wherein R$^1$ and R$^2$, together with the nitrogen atom, form a heterocyclic ring which contains 2 to 10 carbon atoms, and in addition can also be interrupted by 1 to 3 heteroatoms of the third to seventh main group of the periodic table of the elements, such as nitrogen, oxygen or sulfur, or from compounds of the formula (II)

$$\overset{O}{\triangle}-[CH_2]_n-O-[CH_2]_m-\underset{R^4}{\overset{R^3}{Si}}-O-\underset{R^6}{\overset{R^5}{Si}}-R^7, \quad (II)$$

wherein

R$^3$ to R$^7$ are identical or different and represent hydrogen, linear or branched alkyl groups having 1 to 15 carbon atoms, aryl groups having 6 to 10 carbon atoms, cycloalkyl groups having 5 to 10 carbon atoms or aralkyl groups having 1 to 4 carbon atoms in the alkyl part and 6 to 10 carbon atoms in the aryl part, or wherein R$^3$ to R$^7$ represent the radical $$\overset{O}{\triangle}-[CH_2]_o-O-[CH_2]_p-$$

and n, m, o, p independently of one another represent the numbers 1 to 12, the content of functional end groups being 40 to 100 mol %, based on the total number of polymer chains present.

2. A process for the preparation of the modified polymers according to claim 1, wherein conjugated dienes or conjugated dienes and vinylaromatic compounds are reacted in an inert organic solvent in the presence of an alkali metal and/or an alkaline earth metal catalyst and the anionic polymer terminated by alkali metal and/or alkaline earth metal is then reacted with at least one of the compounds of the formula (I) and/or (II) mentioned in claim 1, the compounds of the formula (I) and/or (II) being employed in amounts of 0.1 to 10 mol per 1 mol of the initiator employed.

3. Shaped articles comprising the polymers according to claim 1.

4. Shaped articles according to claim 3, wherein said shaped article is a tire or tire component.

* * * * *